United States Patent Office 2,922,811
Patented Jan. 26, 1960

2,922,811
METHOD FOR THE MANUFACTURE OF O-(CHLOROPHENYL) O,O-DIALKYL PHOSPHOROTHIOATES

Edgar C. Britton and Etcyl H. Blair, Midland, Mich., assignors to The Dow Chemical Company, Midland, Mich., a corporation of Delaware No Drawing. Application March 5, 1956
Serial No. 569,295

5 Claims. (Cl. 260—461)

The present invention is concerned with an improved method for the manufacture of O-(chlorophenyl) O,O-dialkyl phosphorothioates of the formula $$R\!-\!O\!-\!\overset{\overset{\displaystyle S}{\|}}{\underset{\underset{\displaystyle O\!-\!X}{|}}{P}}\!-\!O\!-\!X$$

In this and succeeding formulae, R represents a chlorophenyl radical and each X represents a lower alkyl radical, i.e. methyl or ethyl. These compounds have been found to be active as parasiticides and are adapted to be employed as active toxic constituents of compositions for the control of bacteria, fungi, mites and insect organisms such as aphids, southern army worms and flies. The compounds are also useful as preservatives for paper, paint and wood.

Several methods of preparing the O-(chlorophenyl) O,O-dialkyl phosphorothioates are known. In one method, the compounds may be prepared by reacting an O-(chlorophenyl) phosphorodichloridothioate with an alkanol in the presence of a hydrogen chloride acceptor such as pyridine. In another method, the compounds are prepared by the reaction of an O-(chlorophenyl) phosphorodichloridothioate and an alkali metal alcoholate or by the reaction of an O,O-dialkyl phosphorodichloridothioate and an alkali metal phenolate. The contacting of the reactants in such methods is carried out at a temperature of from about 15° to 80° C. Following the reaction, the reaction mixture may be filtered to separate alkali metal chloride or pyridine hydrochloride and obtain the O-(chlorophenyl) O,O-dialkyl phosphorothioate as the filtrate. When operating in accordance with such methods, the O-(chlorophenyl) O,O-dialkyl phosphorothioates are obtained in yields of about 55 percent or lower.

It is an object of the present invention to provide an improved method for the manufacture of O-(chlorophenyl) O,O-dialkyl phosphorothioates. Another object is to provide a method which results in O-(chlorophenyl) O,O-dialkyl phosphorothioates of higher purity and in greater yield than has been obtainable by known methods. Other objects will appear from time to time throughout the following specification and appended claims.

The new method comprises reacting a lower alkanol, i.e. methanol or ethanol with a phosphorochloridothioate of the group consisting of the O-chlorophenyl phosphorodichloridothioates and O-chlorophenyl O-lower alkyl phosphorochloridothioates. The phosphorochloridothioates may be represented by the following formula $$R\!-\!O\!-\!\overset{\overset{\displaystyle S}{\|}}{\underset{\underset{\displaystyle Cl}{|}}{P}}\!-\!Z$$

in which Z represents chlorine or a methoxy or ethoxy radical. The reaction between the lower alkanol and phosphorochloridothioate is carried out in the presence of an alkali metal hydroxide (i.e. sodium or potassium hydroxide) as neutralizing agent. The reaction may be carried out in an inert organic solvent such as toluene, methylene chloride or ethylene dichloride and conveniently by using an excess of the lower alkanol reagent as the solvent. When the reaction is complete the reaction mixture may be distilled under reduced pressure and thereafter washed with water to obtain as a residue the desired O-(chlorophenyl) O,O-dialkyl phosphorothioate. These products are crystalline solids or viscous liquids which are soluble in many organic solvents and of very low solubility in water.

When the reaction is carried out under the described conditions, it results in the substitution of the phosphorus bound chlorine atoms of the O-(chlorophenyl) phosphorodichloridothioate or the O-(chlorophenyl) O-alkyl phosphorochloridothioate with methoxy or ethoxy groups and the formation of alkali metal chloride of reaction. Although the exact mechanics of the reaction are not completely understood, it might be represented as taking place in accordance with the following equations in which M represents the alkali metal:

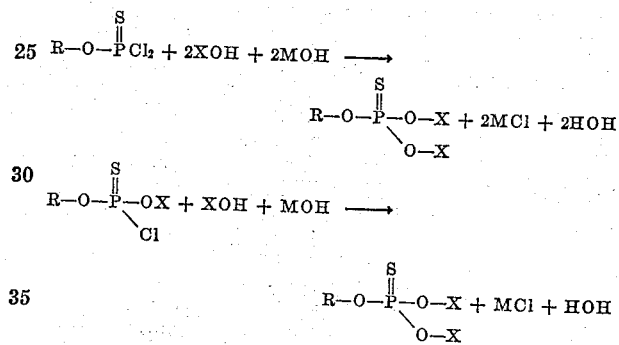

For the production of the O-chlorophenyl O,O-dialkyl phosphorothioates in high yields it is critical and essential that the reaction be carried out at a temperature not in excess of 15° C. and preferably at a temperature of from −15° to 15° C. The reaction takes place smoothly under these temperature conditions with the formation of the desired ester products and hydrogen chloride of reaction which is neutralized by the hydroxide reagent to form alkali metal chloride. Reaction temperatures in excess of 15° C. should not be employed for any appreciable period of time as they materially reduce the yields of the desired ester products.

The rate at which the reaction takes place has been found to vary directly with the temperature employed. In general, the reaction is complete in from about one to three hours. At 0° C., about one hour is required while at lower temperatures a longer period of reaction is necessary.

The employment of substantially two molecular proportions of alkali metal hydroxide and at least two molecular proportions of lower alkanol with two molecular proportions of O-chlorophenyl O-lower alkyl phosphorochloridothioate or with one molecular proportion of O-chlorophenyl phosphorodichloridothioate is desirable for the synthesis of the desired O-(chlorophenyl) O,O-dialkyl phosphorothioates in high yields. Thus, an amount of phosphorochloridothioate reagent sufficient to supply one molecular proportion of phosphorus bound chlorine is employed with at least two molecular proportions of lower alkanol and with substantially two molecular proportions of alkali metal hydroxide. A significantly different amount of the alkali metal hydroxide or a significantly lesser amount of the lower alkanol is not practical since it results in reduced yields of the desired products. The employment of an excess of the lower alkanol in the amount of from 10 to 25 moles per mole of employed phosphorochloridothioate reagent gives increased yields of the desired products. The use of a large excess of the lower alkanol constitutes a preferred embodiment of the present invention.

In carrying out the method of the present invention, a solution of the alkali metal hydroxide in the lower alkanol reagent is added slowly portionwise to the O-chlorophenyl) phosphorodichloridothioate or O-(chlorphenyl) O-lower alkyl phosphorochloridothioate dispersed in the reaction solvent. The addition is carried out with stirring and at a temperature of from $-15°$ to $15°$ C. Following the addition, the reaction mixture may be maintained with stirring in the contacting temperature range for a short period of time to insure completion of the reaction. Upon completion of the reaction, the reaction mixture may be distilled under reduced pressure to separate excess alkanol and reaction solvent and the resulting product successively washed with dilute aqueous acetic or hydrochloric acid and water to obtain the desired product as a residue. The term "lower alkanol" as herein employed refers to methanol and ethanol.

The following examples illustrate the invention but are not to be considered as a limitation thereof:

*Example 1*

O-(2,4,5-trichlorophenyl) O-methyl phosphorochloridothioate (0.5 mole, 163 grams) was dissolved in 800 milliliters of methanol. This solution was placed in a 3 liter, round bottomed flask provided with a stirrer, thermometer, reflux condenser and a dropping funnel. The solution was cooled to $-4°$ C. by means of an ice-salt bath and a methanol solution containing 0.5 mole (20 grams) of sodium hydroxide in 300 milliliters of methanol was slowly added portionwise over a period of 80 minutes. The addition was carried out with stirring and at a temperature of from $0°$ to $-4°$ C. The reaction mixture was then fractionally distilled under reduced pressure to separate excess methanol and thereafter washed with dilute aqueous acetic acid to obtain as a residue an O-(2,4,5-trichlorophenyl) O,O-dimethyl phosphorothioate product in a yield of 93.5 percent of theory. O-(2,4,5-trichlorophenyl) O,O-dimethyl phosphorothioate is a crystalline solid melting at $40°$–$42°$ C.

*Example 2*

In a 5 liter, round bottomed, three necked flask fitted with a stirrer, dropping funnel, reflux condenser and thermometer was placed 4.5 moles (1470 grams of O-(2,4,5-trichlorophenyl) O-methyl phosphorochloridothioate dissolved in 700 milliliters of methylene chloride. The solution was cooled to $10°$ C. and diluted with 700 milliliters of methanol. With stirring and cooling at $10°$ C., or below, three liters of methanol containing 4.5 moles (180 grams) of sodium hydroxide was added portionwise over a period of 3.5 hours. Stirring was thereafter continued for several hours and the reaction mixture thereafter washed with dilute aqueous acetic acid. Upon removal of the methylene chloride by fractional distillation under reduced pressure there was obtained as a residue an O-(2,4,5-trichlorophenyl) O,O-dimethyl phosphorothioate product in a yield of 88 percent of theory.

*Example 3*

In a 5 liter, three necked, round bottomed flask equipped with a stirrer, dropping funnel, thermometer and reflux condenser was placed a solution containing two moles (660.8 grams) of O-(2,4,5-trichlorophenyl) phosphorodichloridothioate dissolved in 660 grams of methylene chloride. This solution was cooled to $5°$ C. and a mixture of 4.0 moles (160 grams) of sodium hydroxide in two liters of methanol was added dropwise with stirring over a period of five hours while the temperature was held constant. The reaction mixture was then washed with dilute aqueous acetic acid and fractionally distilled under reduced pressure to separate methylene chloride solvent. As a result of these operations there was obtained as a residue an O-(2,4,5-trichlorophenyl) O,O-dimethyl phosphorothioate product in a yield of 89.5 percent of theory.

*Example 4*

Sodium hydroxide (0.52 mole) dissolved in 200 milliliters of methanol is added portionwise with stirring to 0.25 mole of O-(3,4-dichlorophenyl) phosphorodichloridothioate (boiling at $140°$–$150°$ C. at 3.5 millimeters) solved in 150 milliliters of methylene chloride. The addition is carried out at a temperature of $10°$ C. and over a period of two hours. The reaction is then treated as previously described to obtain an O-(3,4-dichlorophenyl) O,O-dimethyl phosphorothioate product in a yield of 88 percent of theory. O-(3,4-dichlorophenyl) O,O-dimethyl phosphorothioate is a viscous liquid having a density of 1.418 at $25°$ C. and a refractive index $n/D$ of 1.5547 at $25°$ C. In a similar manner, the method of the present invention may be employed to obtain the very desirable and improved yields of other O-(chlorophenyl) O,O-dialkyl phosphorothioates as follows:

O-(2-chlorophenyl) O,O-dimethyl phosphorothioate by the reaction of O-(2-chlorophenyl) phosphorodichloridothioate with methanol and sodium hydroxide.

O-(4-chlorophenyl) O,O-dimethyl phosphorothioate by the reaction of O-(4-chlorophenyl) O-methyl phosphorochloridothioate with methanol and sodium hydroxide.

O-(2,4-dichlorophenyl) O-methyl-O-ethyl phosphorothioate by the reaction of O-(2,4-dichlorophenyl) O-methyl phosphorochloridothioate with ethanol and potassium hydroxide.

O-(2,3,4,5-tetrachlorophenyl) O-methyl-O-ethyl phosphorothioate by the reaction of O-(2,3,4,5-tetrachlorophenyl) O-methyl phosphorochloridothioate with ethanol and sodium hydroxide.

The O-(chlorophenyl) phosphorodichloridothioates employed as starting materials may be prepared by reacting a molecular excess of phosphorus thiochloride ($PSCl_3$) with an alkali metal chlorphenate. Good results are obtained when employing from two to four moles of phosphorus thiochloride per mole of the chlorphenate. The phenate, preferably as the sodium salt, is added portionwise with stirring to the phosphorous thiochloride and the mixture subsequently warmed for a short time to complete the reaction. The crude reaction mixture is then filtered and the filtrate fractionally distilled under reduced pressure to separate the product.

The O-(chlorophenyl) O-lower alkyl phosphorochloridothioate starting materials may be prepared by the reaction of one molecular proportion of an O-(chlorophenyl) phosphorodichloridothioate with one molecular proportion of an anhydrous alkali metal alcoholate such as sodium methylate or sodium ethylate at a temperature of from $30°$ to $110°$ C. The reaction is carried out in a solvent such as methylene chloride or benzene. Upon completion of the reaction, the reaction mixture is washed and the solvent removed by distillation under reduced pressure to obtain the desired product as a residue.

Having thus described this invention fully and completely as required by the patent statutes, what we desire to particularly point out and distinctly claim is:

1. A method for the manufacture of an O-(chlorophenyl) O,O-dialkyl phosphorothioate having the formula

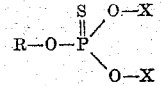

wherein R represents a chlorophenyl radical and each X represents a lower alkyl radical containing from 1 to 2 carbon atoms, inclusive, which comprises reacting at a temperature of from $-15°$ to $15°$ C. an amount of a phosphorochloridothioate sufficient to supply one molecular proportion of phosphorus bound chlorine with at least two molecular proportions of a lower alkanol in the presence of substantially two molecular proportions of an alkali metal hydroxide, the phosphorochloridothioate reagent being selected from the group consisting of the O-(chlorophenyl) phosphorodichloridothioates and the O-(chlorophenyl) O-lower alkyl phosphorochloridothioates.

2. A method claimed in claim 1 in which the phosphorochloridothioate is an O-(chlorophenyl) phosphorodichloridothioate.

3. A method claimed in claim 1 in which the phosphorochloridothioate is O-(2,4,5-trichlorophenyl) phosphorodichloridothioate.

4. A method claimed in claim 1 in which the phosphorochloridothioate is O-(3,4-dichlorophenyl) phosphorodichloridothioate.

5. A method claimed in claim 1 in which the phosphorochloridothioate is O-(2,4,5-trichlorophenyl) O-methyl phosphorocloridothioate.

References Cited in the file of this patent

UNITED STATES PATENTS

| | | |
|---|---|---|
| 2,599,512 | Drake et al. | June 3, 1952 |
| 2,657,229 | Orochena | Oct. 27, 1952 |
| 2,664,437 | Fletcher | Dec. 29, 1953 |
| 2,736,726 | Gaetzi et al. | Feb. 28, 1956 |
| 2,761,806 | Boyer et al. | Sept. 4, 1956 |

FOREIGN PATENTS

| | | |
|---|---|---|
| 157,918 | Australia | July 29, 1954 |